US012749908B2

(12) United States Patent
Tung et al.

(10) Patent No.: US 12,749,908 B2
(45) Date of Patent: Sep. 29, 2026

(54) CHARGING DOCK AND CHARGING DEVICE THEREWITH

(71) Applicant: Wistron Corporation, New Taipei City (TW)

(72) Inventors: Ching-Chih Tung, New Taipei City (TW); Chih-Wei Liao, New Taipei City (TW); Jyun-Cheng Lin, New Taipei City (TW); Tzu-Hao Fang, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 720 days.

(21) Appl. No.: 18/202,278

(22) Filed: May 25, 2023

(65) Prior Publication Data

US 2024/0204547 A1 Jun. 20, 2024

(30) Foreign Application Priority Data

Dec. 16, 2022 (TW) ................................ 111148535

(51) Int. Cl.
*H02J 7/00* (2026.01)
*B60L 53/16* (2019.01)
*H02J 7/60* (2026.01)
*H02J 7/80* (2026.01)

(52) U.S. Cl.
CPC ................ *H02J 7/80* (2026.01); *B60L 53/16* (2019.02); *H02J 7/685* (2026.01)

(58) Field of Classification Search
CPC .............. H02J 7/80; H02J 7/685; B60L 53/16
USPC .......................................................... 320/107
See application file for complete search history.

(56) References Cited

U.S. PATENT DOCUMENTS

| | | | | |
|---|---|---|---|---|
| 11,214,162 | B2 * | 1/2022 | Liu | B60L 53/36 |
| 2010/0085007 | A1 * | 4/2010 | Shu | B25J 19/005 320/107 |
| 2023/0216312 | A1 * | 7/2023 | Laborde | G05D 1/0225 320/107 |

FOREIGN PATENT DOCUMENTS

| | | | |
|---|---|---|---|
| CN | 210897891 | U | 6/2020 |
| CN | 212162150 | U | 12/2020 |
| CN | 212485709 | U | 2/2021 |
| EP | 2 110 896 | A2 | 10/2009 |
| TW | 201436394 | A | 9/2014 |

* cited by examiner

*Primary Examiner* — Nathaniel R Pelton
(74) *Attorney, Agent, or Firm* — Winston Hsu

(57) ABSTRACT

A charging dock is provided and includes an immovable component, a movable component and an electrically conductive component. The movable component is movable along a first direction. The electrically conductive component is disposed through the movable component and movable along the first direction. The electrically conductive component includes a first protruding structure. The movable component includes a second protruding structure. The electrically conductive component is moved along the first direction to drive the movable component to move along the first direction by an abutment of the first protruding structure and the second protruding structure. Besides, a charging device having the aforementioned charging dock is also provided.

20 Claims, 9 Drawing Sheets

CHARGING DOCK AND CHARGING DEVICE THEREWITH

BACKGROUND OF THE INVENTION

1. Field of the Invention

The present invention relates to a charging dock and a charging device therewith, and more specifically, to a charging dock capable of preventing a collision damage of an electrically conductive component and avoiding an electric shock, and a charging device therewith.

2. Description of the Prior Art

With development of technology, robots, automated guided vehicles (AGS) or other automated apparatuses have been widely used in different fields. In order to prevent the robot or the automated guided vehicle from shutting down due to running out of battery, the robot or the automated guided vehicle can be set to move toward a charging station and then dock with a charging dock of the charging station for charging when the battery is low. In order to facilitate docking of the robot or the automated guided vehicle with the charging dock, the charging dock usually has an electrically conductive component with an exposed design. However, the exposed electrically conductive component may not only be easily damaged by collision but also cause a potential electric shock hazard. Therefore, an improvement is needed.

SUMMARY OF THE INVENTION

It is an objective of the present invention to provide a charging dock capable of preventing a collision damage of an electrically conductive component and avoiding an electric shock, and a charging device therewith for solving the aforementioned problem.

In order to achieve the aforementioned objective, the present invention discloses a charging dock. The charging dock includes an immovable component, a movable component and at least one electrically conductive component. The movable component is movable along a first direction. The at least one electrically conductive component is disposed through the movable component and movable along the first direction. Each of the at least one electrically conductive component includes a first protruding structure. The movable component includes at least one second protruding structure. The at least one electrically conductive component is moved along the first direction to drive the movable component to move along the first direction by an abutment of the first protruding structure and the at least one second protruding structure.

According to an embodiment of the present invention, the movable component further includes at least one third protruding structure, and the first protruding structure moves toward the at least one third protruding structure along a second direction opposite to the first direction in response to the at least one electrically conductive component moves along the second direction.

According to an embodiment of the present invention, the charging dock further includes at least one resilient component disposed between the immovable component and the movable component.

According to an embodiment of the present invention, the charging dock further includes at least one recovering component disposed between the movable component and the at least one electrically conductive component.

According to an embodiment of the present invention, an equivalent elastic coefficient of the at least one recovering component is less than an equivalent elastic coefficient of the at least one resilient component.

According to an embodiment of the present invention, the movable component further includes a first body and a second body. The first body is detachably connected to the second body. The at least one second protruding structure is formed on the first body. The at least one electrically conductive component is disposed through the first body and the second body. Each of the at least one electrically conductive component includes an electrically conductive body and a sleeve body disposed outside the electrically conductive body. Two ends of the electrically conductive body protrude out of the sleeve body, and the first protruding structure is formed on the sleeve body.

According to an embodiment of the present invention, the movable component further includes at least one third protruding structure formed on the second body, and the first protruding structure of the at least one electrically conductive component moves toward the at least one third protruding structure along a second direction opposite to the first direction in response to the at least one electrically conductive component moves along the second direction.

According to an embodiment of the present invention, the charging dock further includes at least one resilient component disposed between the immovable component and the second body and configured to drive the movable component to move along a second direction opposite to the first direction.

According to an embodiment of the present invention, the charging dock further includes at least one recovering component disposed between the at least one second protruding structure and the first protruding structure of the at least one electrically conductive component.

According to an embodiment of the present invention, the charging dock further includes a sensor disposed on the immovable component and configured to cooperate with the at least one electrically conductive component, so as to generate a signal for providing electricity to the at least one electrically conductive component.

In order to achieve the aforementioned objective, the present invention further discloses a charging device. The charging device includes a main body and a charging dock. The charging dock includes an immovable component, a movable component and at least one electrically conductive component. The immovable component is fixedly disposed on the main body. The movable component is movable along a first direction. The at least one electrically conductive component is disposed through the movable component and movable along the first direction. Each of the at least one electrically conductive component includes a first protruding structure. The movable component includes at least one second protruding structure. The at least one electrically conductive component is moved along the first direction to drive the movable component to move along the first direction by an abutment of the first protruding structure and the at least one second protruding structure.

According to an embodiment of the present invention, the movable component further includes at least one third protruding structure, and the first protruding structure moves toward the at least one third protruding structure along a second direction opposite to the first direction in response to the at least one electrically conductive component moves along the second direction.

According to an embodiment of the present invention, the charging dock further includes at least one resilient component disposed between the immovable component and the movable component.

According to an embodiment of the present invention, the charging dock further includes at least one recovering component disposed between the movable component and the at least one electrically conductive component.

According to an embodiment of the present invention, an equivalent elastic coefficient of the at least one recovering component is less than an equivalent elastic coefficient of the at least one resilient component.

According to an embodiment of the present invention, the movable component further includes a first body and a second body. The first body is detachably connected to the second body. The at least one second protruding structure is formed on the first body. The at least one electrically conductive component is disposed through the first body and the second body. Each of the at least one electrically conductive component includes an electrically conductive body and a sleeve body disposed outside the electrically conductive body. Two ends of the electrically conductive body protrude out of the sleeve body, and the first protruding structure is formed on the sleeve body.

According to an embodiment of the present invention, the movable component further includes at least one third protruding structure formed on the second body, and the first protruding structure of the at least one electrically conductive component moves toward the at least one third protruding structure along a second direction opposite to the first direction in response to the at least one electrically conductive component moves along the second direction.

According to an embodiment of the present invention, the charging dock further includes at least one resilient component disposed between the immovable component and the second body and configured to drive the movable component to move along a second direction opposite to the first direction.

According to an embodiment of the present invention, the charging dock further includes at least one recovering component disposed between the at least one second protruding structure and the first protruding structure of the at least one electrically conductive component.

According to an embodiment of the present invention, the charging device further includes a power supply unit disposed on the main body and electrically connected to the at least one electrically conductive component, and the charging dock further includes a sensor disposed on the immovable component and configured to cooperate with the at least one electrically conductive component, so as to generate a signal for controlling the power supply unit to provide electricity to the at least one electrically conductive component.

In summary, in the present invention, when the electrically conductive component is forced along the first direction, the electrically conductive component can move along the first direction, so that the second protruding structure is forced to drive the movable component to move along the first direction for allowing a two-stage movement of the electrically conductive component along the first direction. Therefore, the present invention can effectively prevent a collision damage of the electrically conductive component when the robot or the automated guided vehicle is docked with the charging dock or the charging device. Furthermore, in the present invention, the sensor can cooperate with the electrically conductive component for selectively generating a signal for starting or stopping providing electricity. Therefore, the present invention also prevents an electric shock hazard due to an accidental touch of electrically conductive component.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct electrical/mechanical connection. Thus, if a first device is connected to a second device, that connection may be through a direct electrical/mechanical connection, or through an indirect electrical/mechanical connection via other devices and connections.

Figure 1:
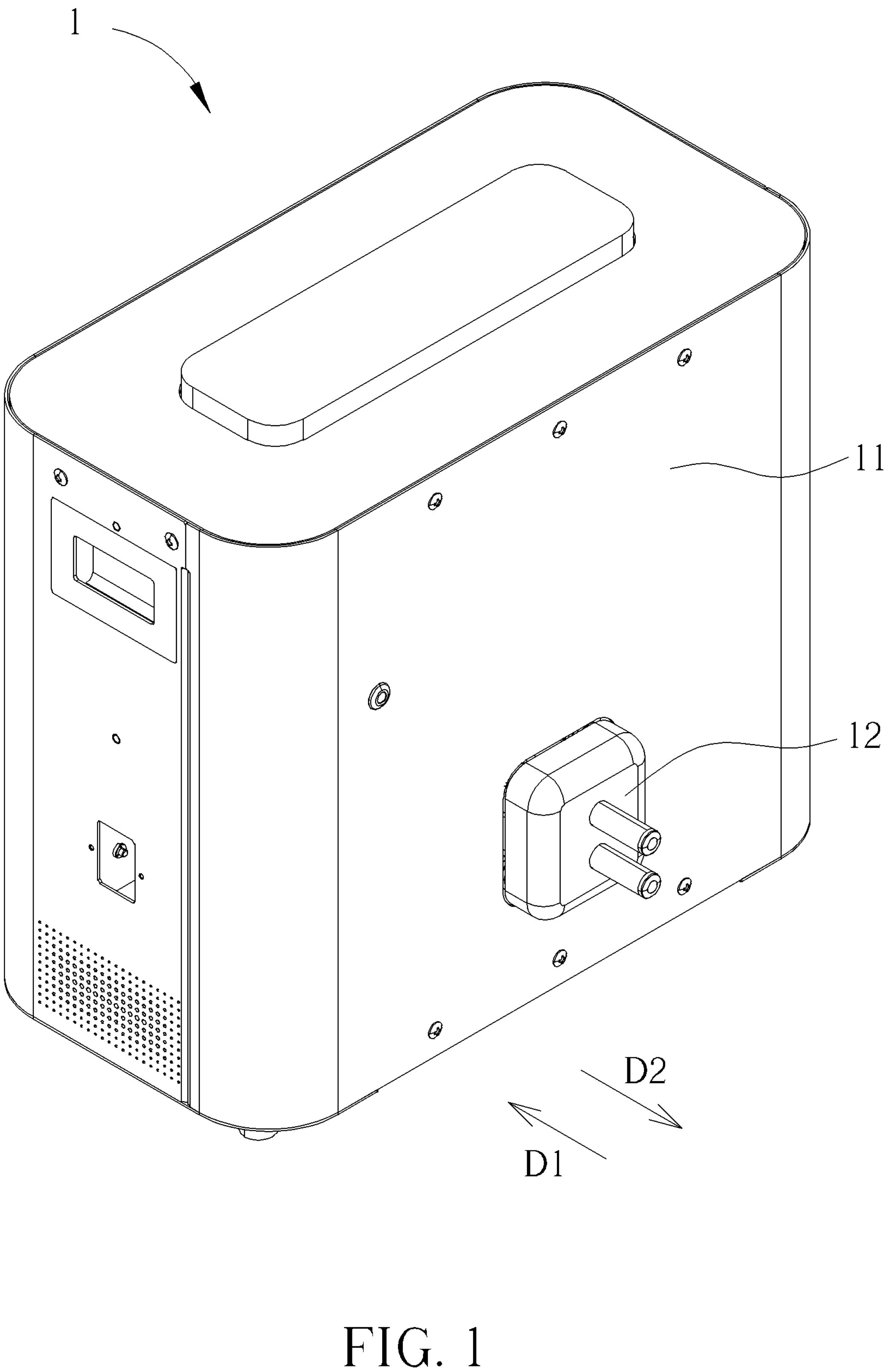
FIG. 1 is a schematic diagram of a charging device according to an embodiment of the present invention.
Figure 2:
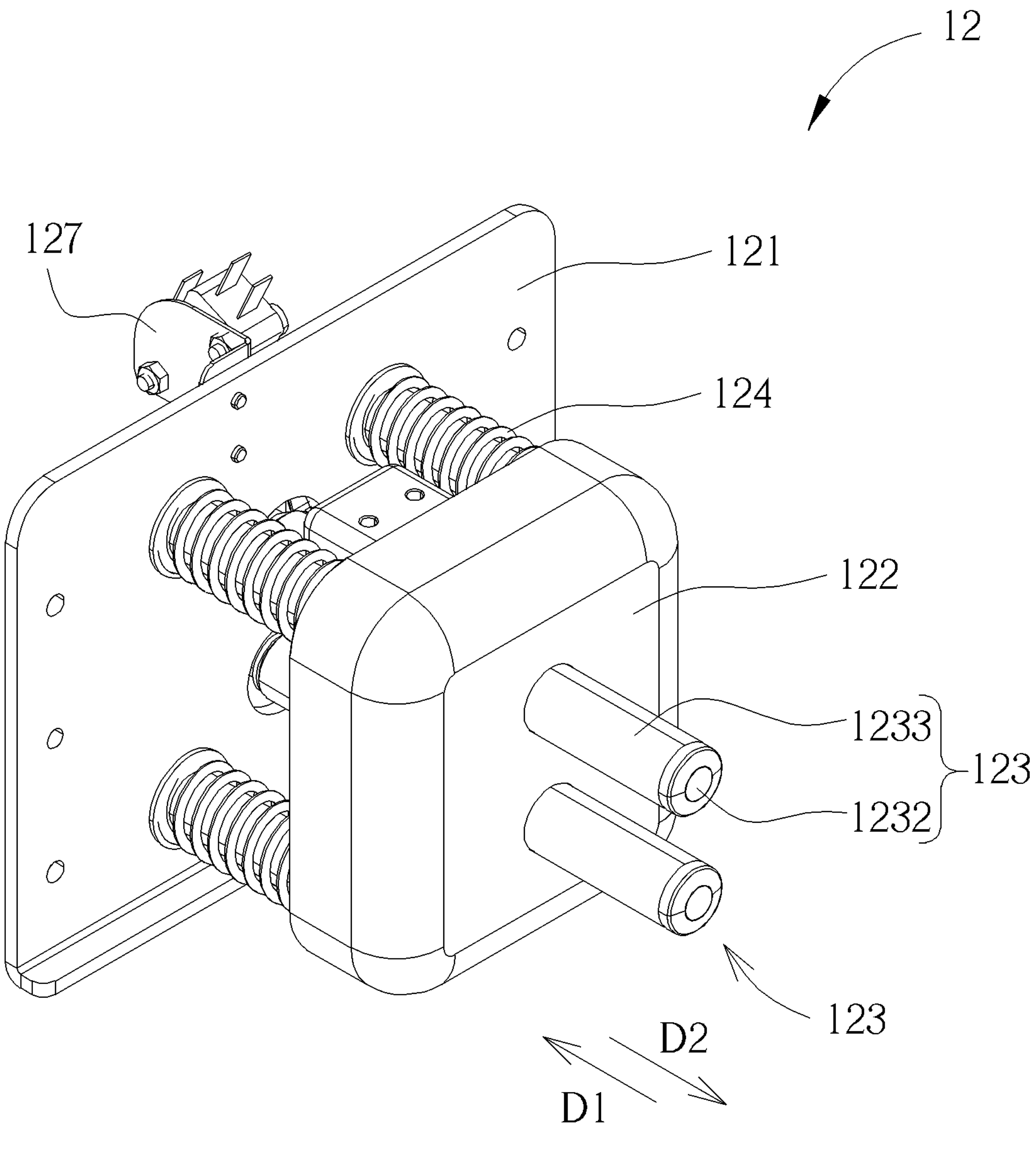
FIG. 2 and FIG. 3 are partial diagrams of the charging device at different views according to the embodiment of the present invention.
Figure 3:
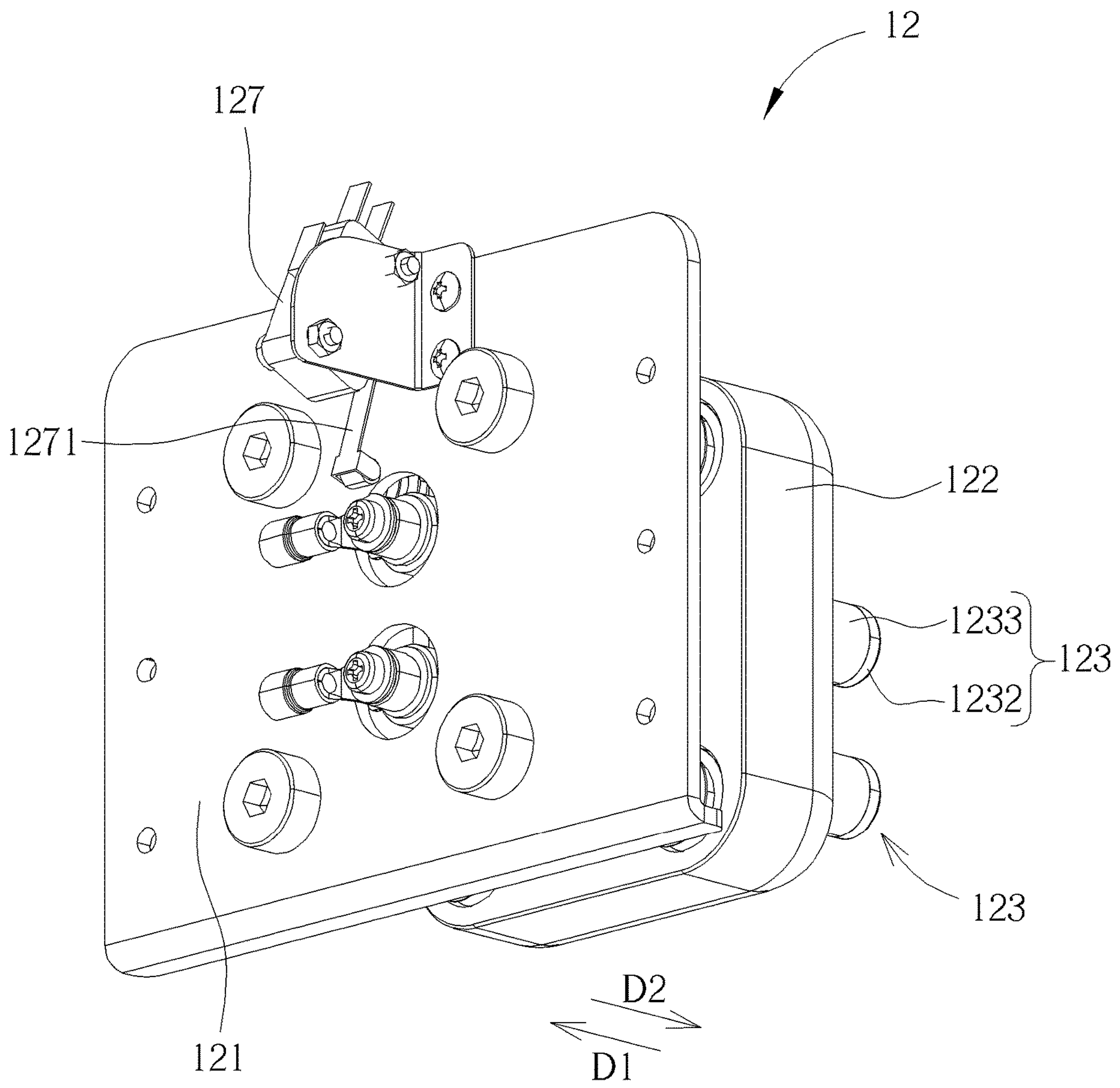
Figure 4:
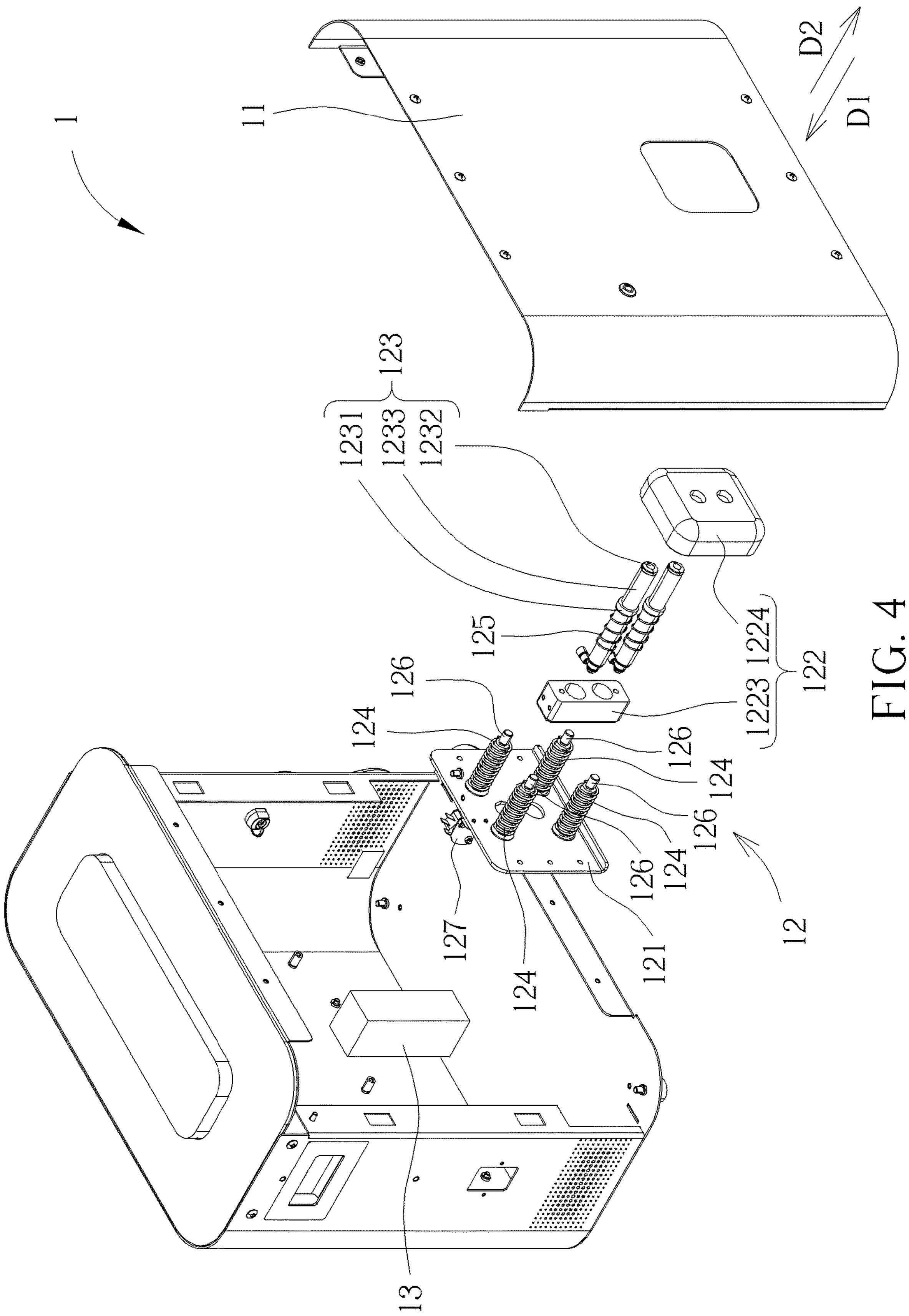
FIG. 4 and FIG. 5 are partial exploded diagrams of the charging device at different views according to the embodiment of the present invention.
Figure 5:
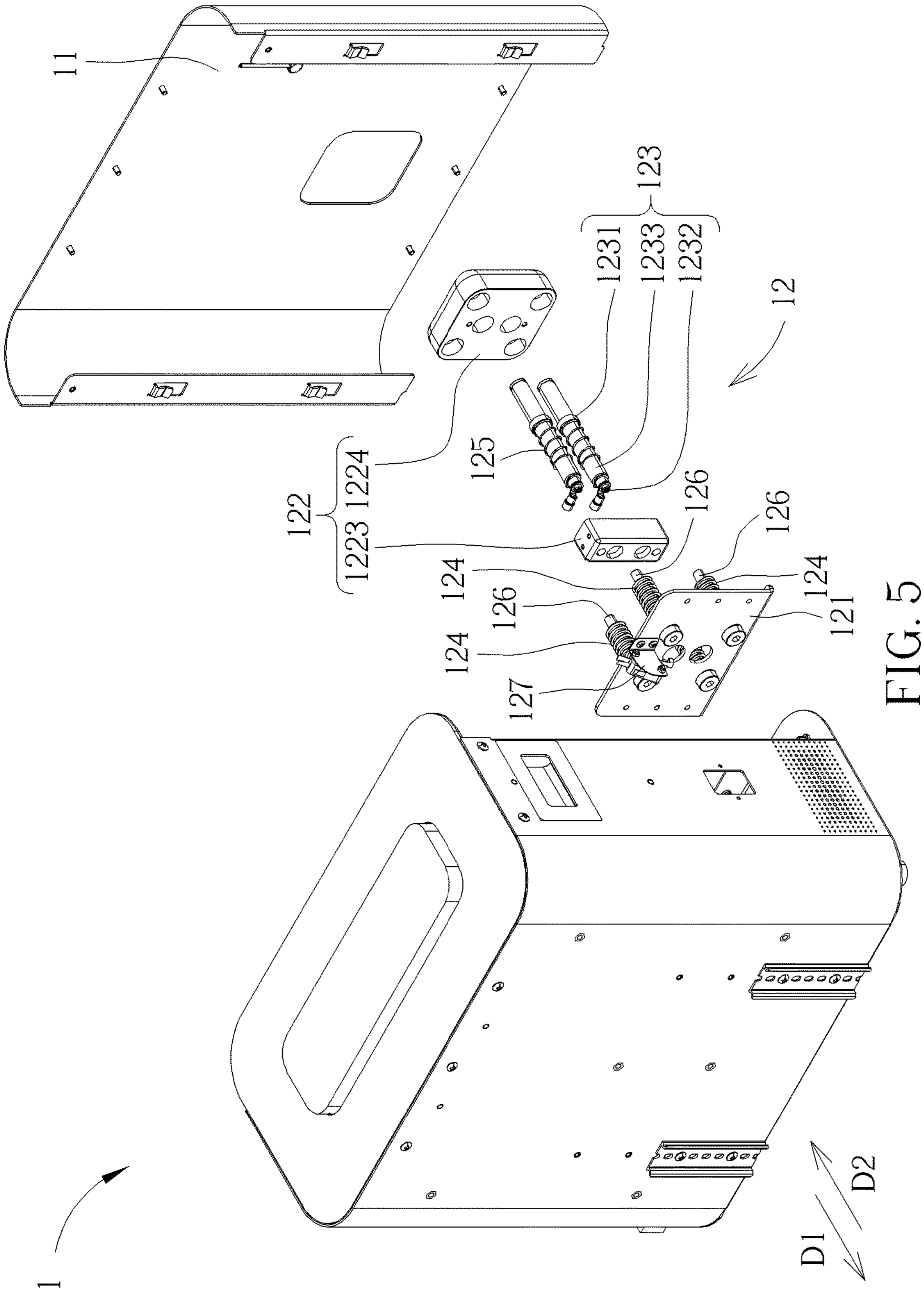

Please refer to FIG. 1 to FIG. 5. FIG. 1 is a schematic diagram of a charging device 1 according to an embodiment of the present invention. FIG. 2 and FIG. 3 are partial diagrams of the charging device 1 at different views according to the embodiment of the present invention. FIG. 4 and FIG. 5 are partial exploded diagrams of the charging device 1 at different views according to the embodiment of the present invention. As shown in FIG. 1 to FIG. 5, the charging device 1 can be used to charge a robot or an automated guided vehicle, which is not shown in the figures. The charging device 1 includes a main body 11 and a charging dock 12. The charging dock 12 includes an immovable component 121, a movable component 122 and two electrically conductive components 123. The immovable component 121 is fixedly disposed on the main body 11. For example, there can be a screw mount, which is not shown in the figures, disposed on the main body 11, and the immovable component 121 can be detachably fastened onto the main body 11 by a cooperation of a screw member, which is not shown in the figures, and the screw mount. The movable component 122 is movable along a first direction D1 or a second direction D2 opposite to the first direction D1. Each of the electrically conductive components 123 is disposed through the movable component 122 and movable along the first direction D1 or the second direction D2. Each of the electrically conductive components 123 is configured to abut against a corresponding electrical contact of the robot or the automated guided vehicle for charging the robot or the automated guided vehicle.

However, the number of the electrically conductive component is not limited to this embodiment. For example, in another embodiment, the charging dock can include only one electrically conductive component.

Figure 6:
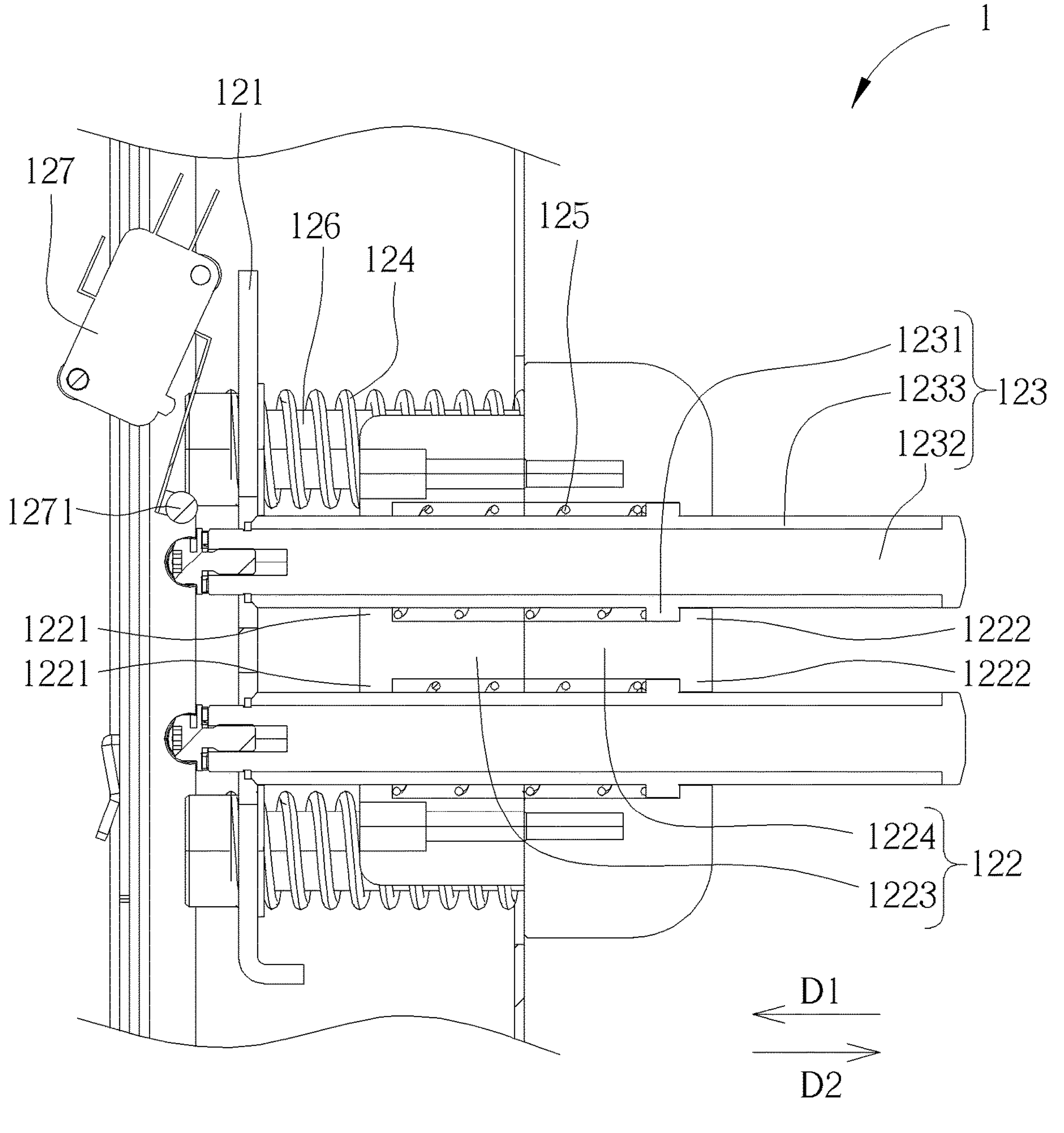
FIG. 6 to FIG. 8 are partial sectional diagrams of the charging device in different states according to the embodiment of the present invention.
Figure 7:
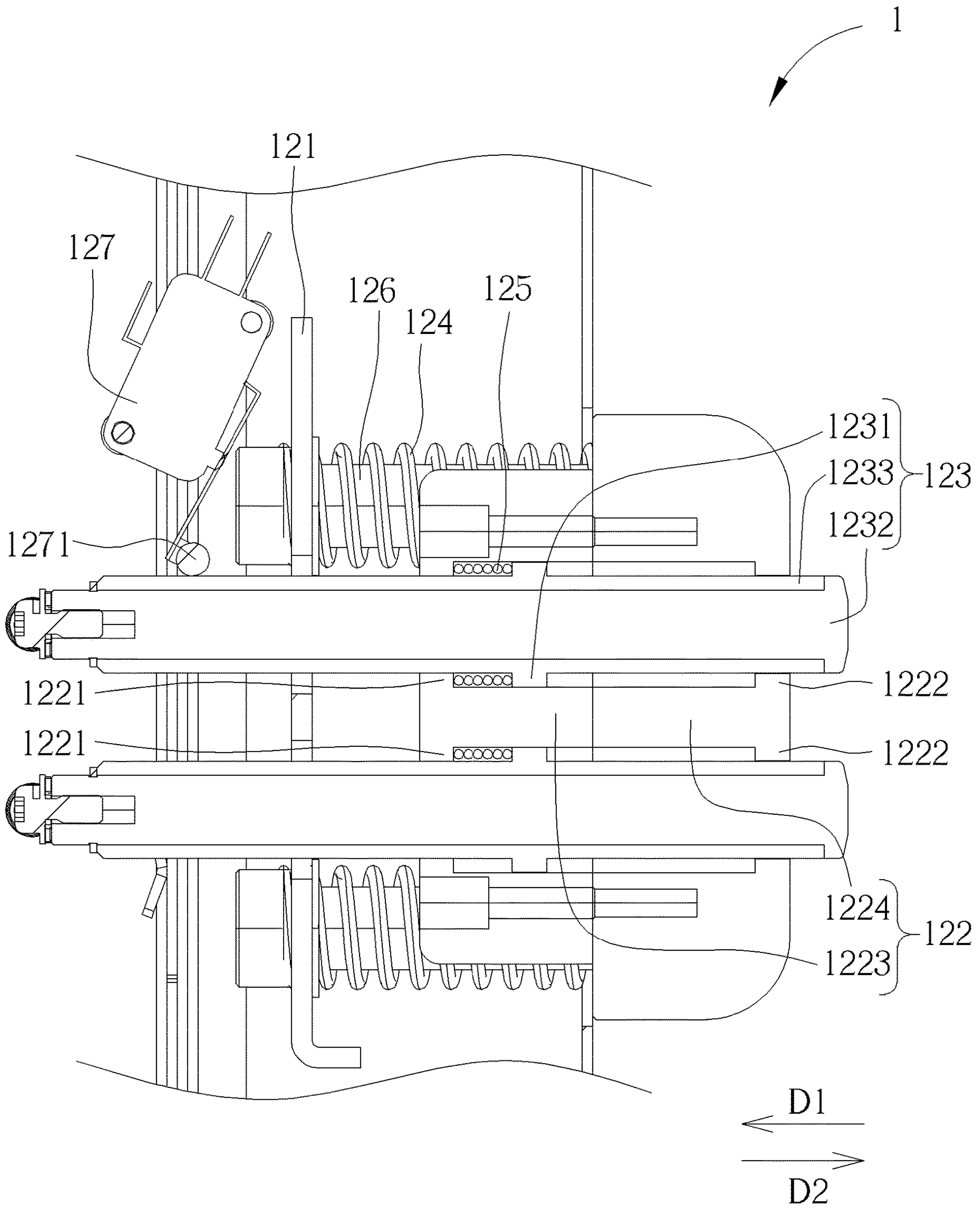
Figure 8:
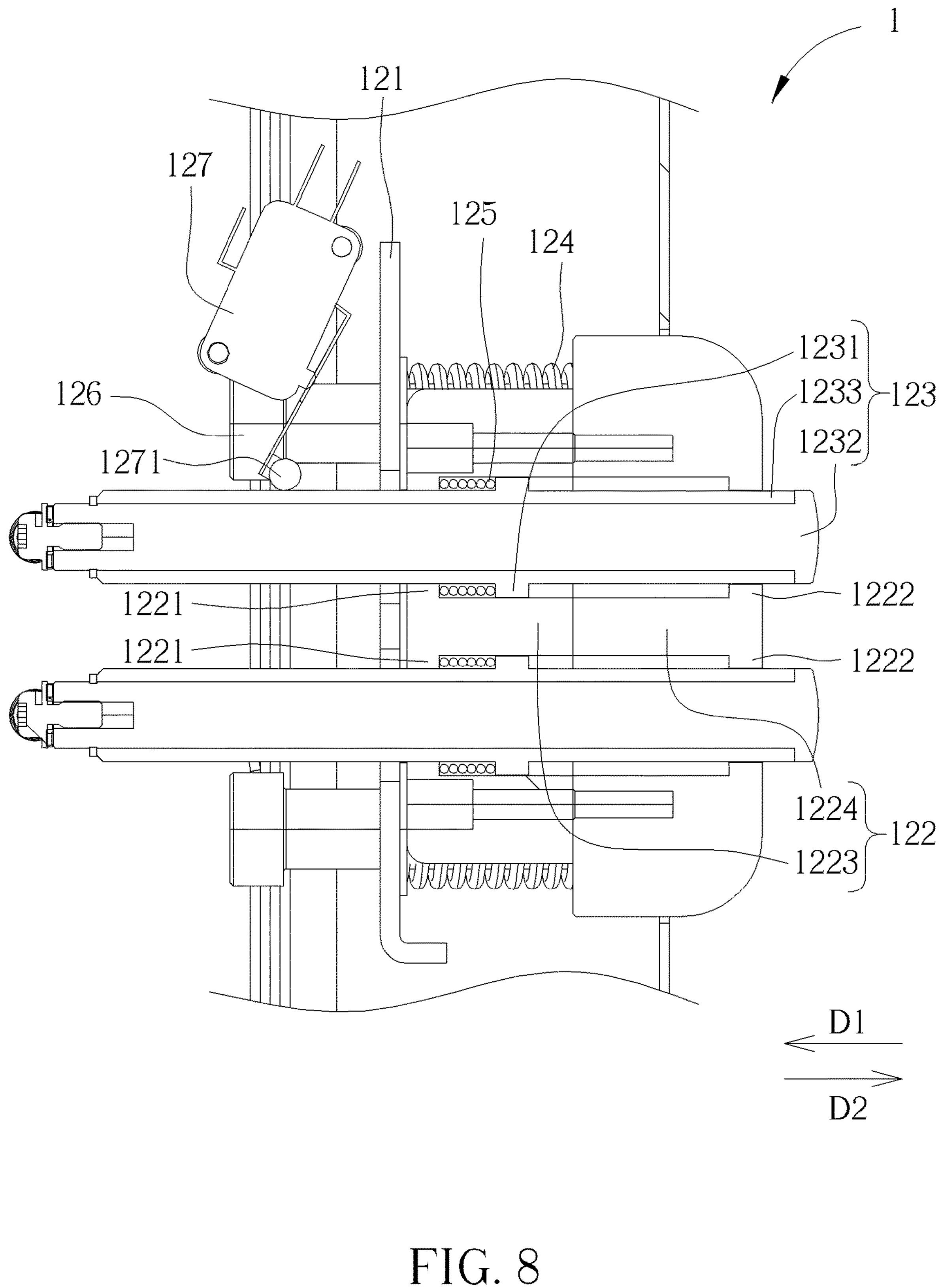

Please refer to FIG. 6 to FIG. 8. FIG. 6 to FIG. 8 are partial sectional diagrams of the charging device 1 in different states according to the embodiment of the present invention. Specifically, the movable component 122 is movable between a first position as shown in FIG. 8 and a second position as shown in FIG. 6 and FIG. 7. Each of the electrically conductive components 123 is movable among a third position as shown in FIG. 7, a fourth position as shown in FIG. 6 and a fifth position as shown in FIG. 8. In other words, when the charging device 1 switches between a state as shown in FIG. 6 and a state as shown in FIG. 7, the movable component 122 does not move and is retained at the second position, and each of the electrically conductive components 123 moves between the fourth position as shown in FIG. 6 and the third position as shown in FIG. 7. When the charging device 1 switches between the state as shown in FIG. 7 and a state as shown in FIG. 8, the movable component 122 moves between the second position as shown in FIG. 7 and the first position as shown in FIG. 8, and each of the electrically conductive components 123 moves between the third position as shown in FIG. 7 and the fifth position as shown in FIG. 8.

More specifically, as shown in FIG. 4 to FIG. 8, each of the electrically conductive components 123 includes a first protruding structure 1231. The movable component 122 includes two second protruding structures 1221 configured to cooperate with the first protruding structures 1231 of the two electrically conductive components 123 respectively. When each of the electrically conductive components 123 is driven, e.g., each of the electrically conductive components 123 is pushed by the corresponding electrical contact of the robot or the automated guided vehicle, to move from the fourth position as shown in FIG. 6 to the third position as shown in FIG. 7 along the first direction D1, the corresponding first protruding structure 1231 moves toward the corresponding second protruding structure 1221 along the first direction D1. When each of the electrically conductive components 123 is driven, e.g., each of the electrically conductive components 123 is pushed by the corresponding electrical contact of the robot or the automated guided vehicle, to move from the third position as shown in FIG. 7 to the fifth position as shown in FIG. 8 along the first direction D1, the corresponding second protruding structure 1221 is forced by the corresponding first protruding structure 1231 to drive the movable component 122 to move from the second position as shown in FIG. 7 to the first position as shown in FIG. 8 along the first direction D1, i.e., when the charging device 1 switches from the state as shown in FIG. 7 and the state as shown in FIG. 8, each of the electrically conductive components 123 is moved along the first direction D1 to drive the movable component 122 to move along the first direction D1 by an abutment of the corresponding second protruding structure 1221 and the corresponding first protruding structure 1231.

Furthermore, as shown in FIG. 4 to FIG. 8, the movable component 122 further includes two third protruding structures 1222 configured to cooperate with the first protruding structures 1231 of the two electrically conductive components 123 respectively. When each of the electrically conductive components 123 is driven to move from the third position as shown in FIG. 7 to the fourth position as shown in FIG. 6 along the second direction D2, the corresponding first protruding structure 1231 moves toward the corresponding third protruding structure 1222 along the second direction D2. Each of the third protruding structures 1222 is configured to abut against the corresponding first protruding structure 1231 for preventing a disengaging movement of the corresponding electrically conductive component 123 from the movable component 122 along the second direction D2.

However, the numbers of the second protruding structure and the third protruding structure are not limited to this embodiment. For example, in another embodiment, the movable component can include only one second protruding structure and one third protruding structure.

In this embodiment, the first protruding structure 1231, the second protruding structure 1221 and the third protruding structure 1222 can be protruding rims. However, the present invention is not limited to this embodiment. For example, in another embodiment, the first protruding structure, the second protruding structure and the third protruding structure can be protruding lugs or protruding blocks.

Besides, as shown in FIG. 4 to FIG. 8, the charging dock 12 further includes four resilient components 124 and two recovering components 125. Each of the resilient components 124 is disposed between the immovable component 121 and the movable component 122 and configured to drive the movable component 122 to move toward the second position along the second direction D2. The four resilient components 124 can be located adjacent to four corners of the movable component 122. Each of the recovering components 125 is disposed between the movable component 122 and the corresponding electrically conductive component 123 and configured to drive the corresponding electrically conductive component 123 to move toward the fourth position along the second direction D2.

However, the numbers of the resilient component and the recovering component are not limited to this embodiment. For example, in another embodiment, the charging dock can include only one resilient component and one recovering component. Furthermore, a position of the resilient component can be determined according to practical demands. For example, in another embodiment, when the charging dock can include only one resilient component, the resilient component can be positioned adjacent to a central portion of the movable component.

It should be noticed that an elastic coefficient of each of the recovering components 125 can be less than an elastic coefficient of each of the resilient components 124. In such a way, when each of the electrically conductive components 123 is pushed by the corresponding electrical contact of the robot or the automated guided vehicle, the recovering components 125 can be resiliently deformed apparently before deformations of the resilient components 124, so that the charging device 1 switches from the state as shown in FIG. 6 to the state as shown in FIG. 7, i.e., each of the electrically conductive components 123 moves from the fourth position as shown in FIG. 6 to the third position as shown in FIG. 7. Furthermore, when each of the electrically conductive components 123 moves from the fourth position as shown in FIG. 6 to the third position as shown in FIG. 7, a resilient deformation of each of the resilient components 124 is not apparent and can be omitted because a acting force applied on each of the resilient components 124 is too small. Afterwards, when each of the recovering components 125 cannot be resiliently deformed anymore, i.e., a length of each of the recovering components 125 is resiliently compressed from a free length as shown in FIG. 6 to a minimum length as shown in FIG. 7, each of the resilient components 124 can be resiliently deformed apparently, so that the charging device 1 switches from the state as shown in FIG. 7 to the state as shown in FIG. 8, i.e., the movable component 122 moves from the second position as shown in FIG. 7 to the first position as shown in FIG. 8, and each of the electrically conductive components 123 moves from the third position as shown in FIG. 7 to the fifth position as shown in FIG. 8.

However, the present invention is not limited to this embodiment. For example, in another embodiment, the charging dock can include more resilient components arranged in parallel to increase an equivalent elastic coefficient of the resilient components, so as to allow the recovering components to be resiliently deformed apparently before deformations of the resilient components, i.e., the elastic coefficient of each of the recovering components can be not less than the elastic coefficient of each of the resilient components as long as an equivalent elastic coefficient of the recovering components is less than the equivalent elastic coefficient of the resilient components.

In this embodiment, the resilient component 124 can be a compression spring disposed between the immovable component 121 and the movable component 122. The recovering component 125 can be a compression spring disposed between the first protruding structure 1231 and the second protruding structure 1221. In other words, in this embodiment, the first protruding structure 1231 forces the second protruding structure 1221 by the recovering component 125, and the first protruding structure 1231 does not contact with the second protruding structure 1221 directly. However, the present invention is not limited to this embodiment. For example, in another embodiment, the resilient component and/or the recovering component can be a torsional spring, a leaf spring or a rubber elastomer. Alternatively, in another embodiment, the recovering component can be an extension spring disposed between the first protruding structure and the third protruding structure.

In order to facilitate assembly of the charging dock 12, as shown in FIG. 2 to FIG. 8, the charging dock 12 includes four movable columns 126. Each of the movable columns 126 is disposed through the immovable component 121 and movable together with the movable component 122 relative to the immovable component 121 along the first direction D1 or the second direction D2. The movable component 122 further includes a first body 1223 and a second body 1224. The first body 1223 is detachably connected to the second body 1224, e.g., by a screw member, and located between the second body 1224 and the immovable component 121. An end of each of the movable columns 126 is connected to the second body 1224. Each of the electrically conductive components 123 is disposed through the first body 1223 and the second body 1224. Each of the second protruding structures 1221 is formed on the first body 1223. Each of the third protruding structures 1222 is formed on the second body 1224. Each of the first protruding structure 1231 is movably located between the corresponding second protruding structure 1221 and the corresponding third protruding structure 1222. Each of the resilient components 124 is sleeved outside the corresponding movable column 126 and disposed between the immovable component 121 and the second body 1224. Each of the recovering components 125 is sleeved outside the corresponding electrically conductive component 123 and disposed between the corresponding second protruding structure 1221 and the corresponding first protruding structure 1231.

Figure 9:
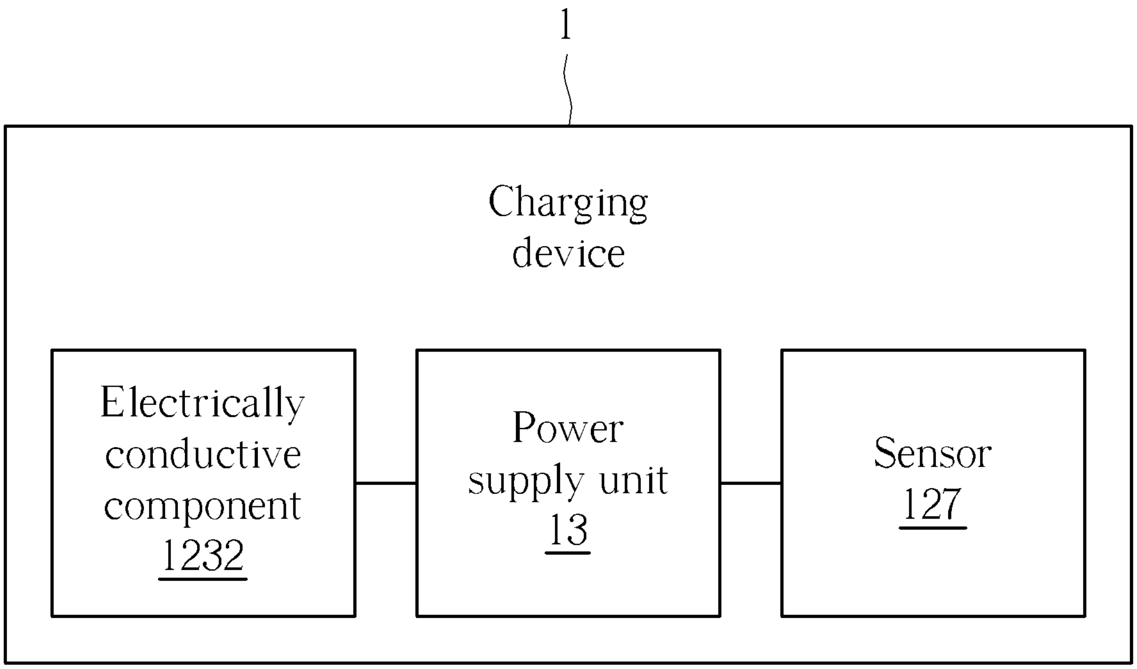
FIG. 9 is a functional block diagram of the charging device according to the embodiment of the present invention.

In addition, please refer to FIG. 2 to FIG. 9. FIG. 9 is a functional block diagram of the charging device 1 according to the embodiment of the present invention. In order to improve using safety of the charging device 1, as shown in FIGS. 3 and 9, the charging device 1 further includes a power supply unit 13 disposed on the main body 11 and electrically connected to the electrically conductive components 123. The power supply unit 13 can be a hardware device that converts AC electricity into DC electricity. As shown in FIG. 2 to FIG. 9, the charging dock 12 further includes a sensor 127 disposed on the immovable component 121. Each of the electrically conductive components 123 includes an electrically conductive body 1232 and a sleeve body 1233. Each of the sleeve bodies 1233 is dispose outside the corresponding electrically conductive body 1232. For example, each of the sleeve bodies 1233 can be sleeved outside the corresponding electrically conductive body 1232. Two ends of each of the electrically conductive bodies 1232 protrude out of the corresponding sleeve body 1233 and configured to be electrically connected to the corresponding electrical contact of the robot or the automated guided vehicle and a corresponding terminal of the power supply unit 13 respectively. For example, the power supply unit 13 can include a positive terminal and a negative terminal, which are not shown in the figures. The positive terminal of the power supply unit 13 can be electrically connected to the two corresponding electrically conductive bodies 1232, e.g., by two electrical wires, which are not shown in the figures, and the negative terminal of the power supply unit 13 can be electrically connected to the other two corresponding electrically conductive bodies 1232, e.g., by another two electrical wires, which are not shown in the figures. Each of the first protruding structures 1231 is formed on the corresponding sleeve body 1233. The sleeve body 1233 can be made of electrically insulating material for avoiding electric leakage In this embodiment, the sensor 127 can be a contact sensor and include a probe 1271. When the electrically conductive component 123 corresponding to the sensor 127 moves to the third position as shown in FIG. 7 along the first direction D1, the sleeve body 1233 corresponding to the sensor 127 contacts with the probe 1271 of the sensor 127, so that the sensor 127 generates a power-on signal for actuating the power supply unit 13 to provide electricity to the electrically conductive body 1232 for charging the robot or the automated guided vehicle. When the electrically conductive component 123 corresponding to the sensor 127 moves away from the third position as shown in FIG. 7 along the second direction D2, the sleeve body 1233 corresponding to the sensor 127 does not contact with the probe 1271 of the sensor 127, so that the sensor 127 does not generate the power-on signal and the power supply unit 13 does not provide electricity to the electrically conductive body 1232 accordingly.

However, the present invention is not limited to this embodiment. For example, in another embodiment, the sensor can be a non-contact sensor, e.g., a light sensor, and cooperates with the sleeve body of the electrically conductive component or any other structure in a non-contacting manner, so as to selectively generate a power-off signal to control the power supply unit to stop providing electricity to the electrically conductive body 1232, e.g., when e.g., the light sensor is blocked from receiving light by the sleeve body of the electrically conductive component.

Detailed description for operational principle of the present invention is provided as follows. The robot or the automated guided vehicle can be set to stop pushing the electrically conductive components 123 along the first direction by the electrical contacts when each of the electrically conductive components 123 moves to the third position. When each of the electrically conductive components 123 is pushed by the corresponding electrical contact of the robot or the automated guided vehicle along the first direction D1, the recovering components 125 can be resiliently deformed apparently before deformations of the resilient components 124, so that the charging device 1 can switch from the state as shown in FIG. 6 to the state as shown in FIG. 7, i.e., each of the electrically conductive components 123 moves from the fourth position as shown in FIG. 6 to the third position as shown in FIG. 7. When each of the electrically conductive components 123 moves from the fourth position as shown in FIG. 6 to the third position as shown in FIG. 7, the sleeve body 1233 of the electrically conductive component 123 corresponding to the sensor 127 can contact with the probe 1271 of the sensor 127, so that the sensor 127 generates the power-on signal. When the sensor 127 generates the power-on signal, the power supply unit 13 provides electricity to the electrically conductive body 1232 in response to the power-on signal, for charging the robot or the auto-mated vehicle.

In some scenarios, due to inaccurate positioning or delay of signal controlling of the robot or the automated guided vehicle, the robot or the automated guided vehicle might still push the electrically conductive components 123 along the first direction D1 by the electrical contacts even when each of the electrically conductive components 123 moves to the third position. At this moment, since each of the recovering components 125 cannot be resiliently deformed anymore, each of the resilient components 124 is resiliently deformed apparently, so as to allow the movable component 122 to move from the second position as shown in FIG. 7 to the first position as shown in FIG. 8 and allow each of the electrically conductive components 123 to move from the third position as shown in FIG. 7 to the fifth position as shown in FIG. 8, so as to switch the charging device 1 from the state as shown in FIG. 7 to the state as shown in FIG. 8, for preventing a deformation or damage of the electrically conductive component 123 caused by an excessive stress. It should be noticed that during a process that each of the electrically conductive components 123 moves from the third position as shown in FIG. 7 to the fifth position as shown in FIG. 8, the sleeve body 1233 of the electrically conductive component 123 corresponding to the sensor 127 always contacts with the probe 1271 of the sensor 127, so that the power supply unit 13 continues providing electricity in response to the power-on signal for charging the robot or the automated guided vehicle.

When the robot or the automated guided vehicle moves away from the charging device 1 after completion of charge, each of the electrically conductive components 123 is released, so that each of the resilient components 124 and each of the recovering components 125 can respectively drive the movable component 122 and the corresponding electrically conductive component 123 to move back to the second position and the fourth position as shown in FIG. 6. When each of the electrically conductive components is located at the fourth position as shown in FIG. 6, the sleeve body 1233 of the electrically conductive component 123 corresponding to the sensor 127 does not contact with the probe 1271 of the sensor 127, so that the sensor 127 does not generate the power-on signal. The power supply unit 13 stops providing electricity when the sensor 127 does not generate the power-on signal, which prevents an electric shock hazard due to an accidental touch of electrically conductive component 123.

In contrast to the prior art, in the present invention, when the electrically conductive component is forced along the first direction, the electrically conductive component can move along the first direction, so that the second protruding structure is forced to drive the movable component to move along the first direction for allowing a two-stage movement of the electrically conductive component along the first direction. Therefore, the present invention can effectively prevent a collision damage of the electrically conductive component when the robot or the automated guided vehicle is docked with the charging dock or the charging device. Furthermore, in the present invention, the sensor can cooperate with the electrically conductive component for selectively generating a signal for starting or stopping providing electricity. Therefore, the present invention also prevents an electric shock hazard due to an accidental touch of electrically conductive component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging dock comprising:

an immovable component;

a movable component movable along a first direction; and at least one electrically conductive component disposed through the movable component and movable along the first direction, each of the at least one electrically conductive component comprising a first protruding structure, the movable component comprising at least one second protruding structure, the at least one electrically conductive component being moved along the first direction to drive the movable component to move along the first direction by an abutment of the first protruding structure and the at least one second protruding structure.

2. The charging dock of claim 1, wherein the movable component further comprises at least one third protruding structure, and the first protruding structure moves toward the at least one third protruding structure along a second direction opposite to the first direction in response to the at least one electrically conductive component moves along the second direction.

3. The charging dock of claim 1, further comprising at least one resilient component disposed between the immovable component and the movable component.

4. The charging dock of claim 3, further comprising at least one recovering component disposed between the movable component and the at least one electrically conductive component.

5. The charging dock of claim 4, wherein an equivalent elastic coefficient of the at least one recovering component is less than an equivalent elastic coefficient of the at least one resilient component.

6. The charging dock of claim 1, wherein the movable component further comprises a first body and a second body, the first body is detachably connected to the second body, the at least one second protruding structure is formed on the first body, the at least one electrically conductive component is disposed through the first body and the second body, each of the at least one electrically conductive component comprises an electrically conductive body and a sleeve body disposed outside the electrically conductive body, two ends of the electrically conductive body protrude out of the sleeve body, and the first protruding structure is formed on the sleeve body.

7. The charging dock of claim 6, wherein the movable component further comprises at least one third protruding structure formed on the second body, and the first protruding structure of the at least one electrically conductive component moves toward the at least one third protruding structure along a second direction opposite to the first direction in response to the at least one electrically conductive component moves along the second direction.

8. The charging dock of claim 6, further comprising at least one resilient component disposed between the immovable component and the second body and configured to drive the movable component to move along a second direction opposite to the first direction.

9. The charging dock of claim 6, further comprising at least one recovering component disposed between the at least one second protruding structure and the first protruding structure of the at least one electrically conductive component.

10. The charging dock of claim 1, further comprising a sensor disposed on the immovable component and configured to cooperate with the at least one electrically conductive component, so as to generate a signal for providing electricity to the at least one electrically conductive component.

11. A charging device comprising:

a main body; and a charging dock comprising:

an immovable component fixedly disposed on the main body;

a movable component movable along a first direction; and at least one electrically conductive component disposed through the movable component and movable along the first direction, each of the at least one electrically conductive component comprising a first protruding structure, the movable component comprising at least one second protruding structure, the at least one electrically conductive component being moved along the first direction to drive the movable component to move along the first direction by an abutment of the first protruding structure and the at least one second protruding structure.

12. The charging device of claim 11, wherein the movable component further comprises at least one third protruding structure, and the first protruding structure moves toward the at least one third protruding structure along a second direction opposite to the first direction in response to the at least one electrically conductive component moves along the second direction.

13. The charging device of claim 11, wherein the charging dock further comprises at least one resilient component disposed between the immovable component and the movable component.

14. The charging device of claim 13, wherein the charging dock further comprises at least one recovering component disposed between the movable component and the at least one electrically conductive component.

15. The charging device of claim 14, wherein an equivalent elastic coefficient of the at least one recovering component is less than an equivalent elastic coefficient of the at least one resilient component.

16. The charging device of claim 11, wherein the movable component further comprises a first body and a second body, the first body is detachably connected to the second body, the at least one second protruding structure is formed on the first body, the at least one electrically conductive component is disposed through the first body and the second body, each of the at least one electrically conductive component comprises an electrically conductive body and a sleeve body disposed outside the electrically conductive body, two ends of the electrically conductive body protrude out of the sleeve body, and the first protruding structure is formed on the sleeve body.

17. The charging device of claim 16, wherein the movable component further comprises at least one third protruding structure formed on the second body, and the first protruding structure of the at least one electrically conductive component moves toward the at least one third protruding structure along a second direction opposite to the first direction in response to the at least one electrically conductive component moves along the second direction.

18. The charging device of claim 16, wherein the charging dock further comprises at least one resilient component disposed between the immovable component and the second body and configured to drive the movable component to move along a second direction opposite to the first direction.

19. The charging device of claim 16, wherein the charging dock further comprises at least one recovering component disposed between the at least one second protruding structure and the first protruding structure of the at least one electrically conductive component.

20. The charging device of claim 11, further comprising a power supply unit disposed on the main body and electrically connected to the at least one electrically conductive component, and the charging dock further comprising a sensor disposed on the immovable component and configured to cooperate with the at least one electrically conductive component, so as to generate a signal for controlling the power supply unit to provide electricity to the at least one electrically conductive component.

* * * * *